(12) United States Patent
Makley et al.

(10) Patent No.: US 7,529,085 B2
(45) Date of Patent: May 5, 2009

(54) THERMAL DOCKING FANSINK

(75) Inventors: Albert V. Makley, Raleigh, NC (US);
Thomas M. Cipolla, Katonah, NY (US);
Thomas R. Hildner, Austin, TX (US);
Vinod Kamath, Raleigh, NC (US);
Fumitoshi Kiyooka, Yamato (JP);
Lawrence S. Mok, Brewster, NY (US);
Fusanobu Nakamura, Yamato (JP)

(73) Assignee: Lenovo (Singapore) Pte. Ltd. (SG)

( * ) Notice: Subject to any disclaimer, the term of this patent is extended or adjusted under 35 U.S.C. 154(b) by 271 days.

(21) Appl. No.: 11/480,292

(22) Filed: Jun. 30, 2006

(65) Prior Publication Data

US 2008/0002357 A1    Jan. 3, 2008

(51) Int. Cl.
*H05K 7/20*    (2006.01)
(52) U.S. Cl. .................. 361/687; 361/681; 710/303
(58) Field of Classification Search ......... 361/686–688, 361/697, 719, 696, 695, 700, 679, 694; 174/16.3, 174/15.2; 165/80.3, 121, 104.33; 710/303; 415/146
See application file for complete search history.

(56) References Cited

U.S. PATENT DOCUMENTS

| | | | | |
|---|---|---|---|---|
| 5,463,742 | A * | 10/1995 | Kobayashi | 710/303 |
| 5,473,506 | A * | 12/1995 | Kikinis | 361/688 |
| 6,005,770 | A * | 12/1999 | Schmitt | 361/695 |
| 6,042,348 | A | 3/2000 | Aakalu et al. | |
| 6,047,765 | A * | 4/2000 | Zhan | 165/80.3 |
| 6,094,347 | A | 7/2000 | Bhatia | |
| 6,115,250 | A * | 9/2000 | Schmitt | 361/695 |
| 6,122,169 | A * | 9/2000 | Liu et al. | 361/700 |
| 6,137,681 | A * | 10/2000 | Lu | 361/697 |
| 6,137,683 | A * | 10/2000 | Lee et al. | 361/704 |
| 6,166,906 | A * | 12/2000 | Sun et al. | 361/697 |
| 6,172,871 | B1 * | 1/2001 | Holung et al. | 361/687 |
| 6,181,557 | B1 * | 1/2001 | Gatti | 361/695 |
| 6,229,701 | B1 * | 5/2001 | Kung et al. | 361/688 |
| 6,239,970 | B1 | 5/2001 | Nakai et al. | |
| 6,266,243 | B1 | 7/2001 | Tomioka | |
| 6,328,097 | B1 * | 12/2001 | Bookhardt et al. | 165/104.33 |
| 6,348,748 | B1 * | 2/2002 | Yamamoto | 310/62 |
| 6,353,536 | B1 | 3/2002 | Nakamura et al. | |
| 6,421,239 | B1 * | 7/2002 | Huang | 361/696 |
| 6,439,299 | B1 * | 8/2002 | Miyahara et al. | 165/121 |
| 6,491,298 | B1 * | 12/2002 | Criss-Puszkiewicz et al. | 273/148 R |
| 6,522,535 | B1 | 2/2003 | Helot et al. | |
| 6,535,380 | B1 * | 3/2003 | Lee et al. | 361/683 |
| 6,563,703 | B2 * | 5/2003 | Xie | 361/687 |
| 6,574,963 | B1 | 6/2003 | Tadayon et al. | |
| 6,587,340 | B2 * | 7/2003 | Grouell et al. | 361/695 |
| 6,752,201 | B2 * | 6/2004 | Cipolla et al. | 165/121 |
| 6,822,856 | B2 * | 11/2004 | Fujiwara | 361/681 |
| 6,837,057 | B2 | 1/2005 | Pokarna et al. | |
| 7,031,154 | B2 * | 4/2006 | Bash et al. | 361/690 |
| 7,128,526 | B2 * | 10/2006 | Paulsen | 415/146 |
| 7,201,651 | B2 * | 4/2007 | Su | 454/184 |
| 7,312,985 | B2 * | 12/2007 | Lee et al. | 361/687 |
| 7,345,875 | B2 * | 3/2008 | Elkins | 361/695 |

(Continued)

*Primary Examiner*—Jayprakash N Gandhi
*Assistant Examiner*—Courtney L Smith
(74) *Attorney, Agent, or Firm*—Ference & Associates LLC

(57) ABSTRACT

A fansink arrangement for a laptop computer wherein two distinct patterns of air intake can be employed. Particularly, dual air intakes of the laptop can be managed and controlled depending upon an operating mode of the computer. Thus, when the computer is in a "stand alone" mode, only one air intake is employed while in a "docking" mode of the computer two air intakes are employed.

8 Claims, 8 Drawing Sheets

U.S. PATENT DOCUMENTS

| | | |
|---|---|---|
| 2002/0012228 A1 | 1/2002 | Ozaki et al. |
| 2002/0018335 A1 | 2/2002 | Koizumi |
| 2003/0000684 A1* | 1/2003 | Huang et al. ............. 165/104.3 |
| 2003/0005201 A1* | 1/2003 | Olson et al. ................. 710/303 |
| 2003/0053296 A1* | 3/2003 | Tanaka et al. ................ 361/719 |
| 2003/0081382 A1* | 5/2003 | Lin ............................ 361/697 |
| 2003/0095380 A1* | 5/2003 | Chen et al. ................... 361/686 |
| 2003/0161102 A1* | 8/2003 | Lee et al. ..................... 361/687 |

* cited by examiner

THERMAL DOCKING FANSINK

FIELD OF THE INVENTION

The present invention relates generally to computers, particularly laptop computers, and issues relating to the cooling of high-power chips.

BACKGROUND OF THE INVENTION

With the continued development of laptop computers as increasingly powerful tools that rival even desktop computers, concerns continue to arise about the management of various electronic and mechanical functions in a relatively small physical space. Though strides continue to be made in these respects, the ever-rapid increase in the variety and power of laptop functions presents ongoing challenges in general laptop design.

As with virtually any computer, laptops have long relied on fan mechanisms to cool various components, including (perhaps most importantly) the internally disposed computer chips that are part of the CPU. In the case of laptops, space constraints have already yielded creative solutions that preclude the need for large, bulky fans. In this regard, "fansink" arrangements are now commonly employed, where a heat transfer structure (e.g., a fansink fin structure as commonly known) is provided to draw heat from the CPU. Air from a fan then exhausts over this structure with the end result of cooling the computer interior.

Demands for better thermal performance have arisen. For instance, when a laptop is "docked", i.e., connected to a docking station or the like, performance demands tend to be much greater than when the computer is in "undocked" or "mobile" mode, thus placing even greater demands on the existing fan arrangement. Such demands can lead to "throttling", or a thermal overburden of the fan arrangement. Such concerns have led to the employment of dual inlet fansinks, or fansink arrangements with dual air intakes, e.g., with one intake disposed in parallel to side walls of a laptop and another disposed, e.g., on the bottom of the laptop. While this can yield admirable results in terms of cooling a laptop interior, questions have arisen as to whether such an arrangement is really cost-effective.

Accordingly, a growing need has been recognized in connection with-imparting better thermal performance to fansinks in computer settings, particularly in laptops.

SUMMARY OF THE INVENTION

There is broadly contemplated herein, in accordance with at least one presently preferred embodiment of the present invention, a fansink arrangement for a laptop computer wherein two distinct patterns of air intake can be employed. Particularly, dual air intakes of the laptop can be managed and controlled depending upon an operating mode of the computer. Thus, when the computer is in a "stand alone" mode, only one air intake is employed while in a "docking" mode of the computer two air intakes are employed.

In summary, one aspect of the invention provides an apparatus comprising a fan; a first air intake arrangement for admitting air towards or away from said fan; a second air intake arrangement for admitting air towards or away from said fan; and a shutter arrangement for impeding the admission of air towards or away from said fan through one of said first and second air intake arrangements, said shutter arrangement being actuable in response to at least one operating or positional condition of the laptop.

For a better understanding of the present invention, together with other and further features and advantages thereof, reference is made to the following description and the scope of the invention will be pointed out in the appended claims.

BRIEF DESCRIPTION OF THE DRAWINGS

The above and other objects, features, and advantages of the present invention will become more apparent from the following detailed description when taken in conjunction with the accompanying drawings.

DETAILED DESCRIPTION OF THE PREFERRED EMBODIMENTS

Broadly contemplated herein, in accordance with a preferred embodiment of the present invention, is a fansink for use in laptop computers whereby single or dual air intake (through one or both of two air intakes) is employed depending upon a current mode of operation of the computer. In a "standalone", "portable" or "undocked" mode, solely a single air intake is preferably employed. In a "docked" mode, preferably two air intakes are employed. These distinctions essentially prevail in recognition of the greater thermal demands that may be placed on a laptop in a "docked" mode, as opposed to an "undocked" mode.

Preferably, in "standalone" mode, a bottom side air intake is closed off via a spring pin-loaded shutter door that itself is free to move in and out of its own retainer. This shutter door (see FIG. 2) thus selectably prevents air from entering the fansink from the bottom side. In "docked", on the other hand, the bottom side air intake is opened via the spring pin-loaded shutter door (see FIG. 3), thus allowing air to enter the fansink from the bottom side.

It should thus be appreciated that such an arrangement stands in stark contrast to conventional solutions where solely one air intake draws system air into a fan, or where two air intakes serve the same purpose but cannot be selectably opened and closed.

Figure 1:
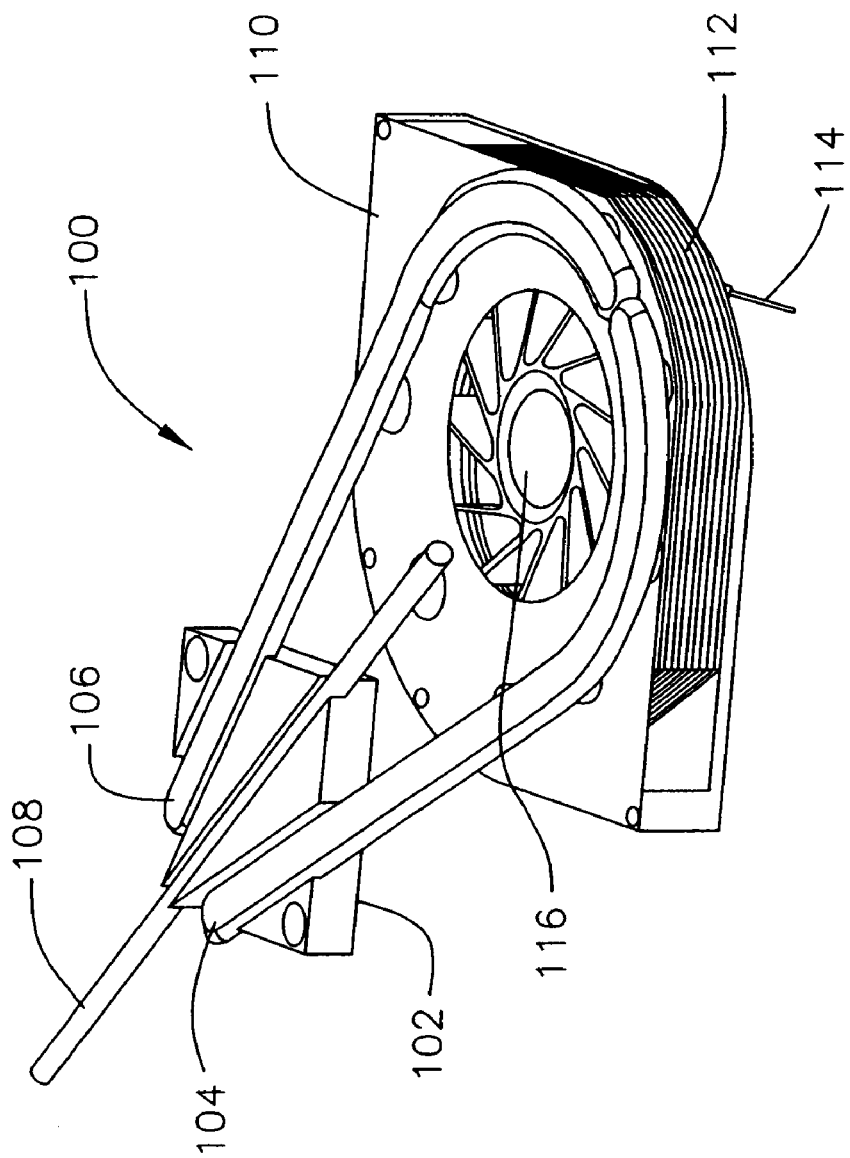
FIG. 1 provides a top perspective view of a fansink in isolation.

FIG. 1 provides a top perspective view of a fansink 100 in isolation, in accordance with a preferred embodiment of the present invention. Fansink 100 includes a CPU plate 102 which is attached to a CPU (not shown) for extracting heat therefrom. Three heatpipes 104, 106, 108 preferably interconnect the CPU plate 102 with fansink enclosure 110. The heatpipes 104/106/108 may be embodied, e.g., by isothermal structures which transport heat from the CPU plate 102 to the fansink enclosure 110 and fin structure 112.

Fansink enclosure 110 may preferably be embodied by plates which sandwich fan 116 (and which are appropriately supported with respect to one another, e.g., via short support legs or lengths of interconnecting wall). Preferably disposed about fan 116 are fansink fins 112. These fins, suitably formed from a thermally conductive material, are configured for serving as a heat sink to afford efficient heat transfer away from CPU plate 102 via heatpipes, especially as incoming air contacts and passes over the fins. (In this regard, fins 112 are preferably oriented so that at least along two orthogonally distinct sides enclosure 110, they will be positioned adjacent vents or holes in a laptop cover [not shown here]).

Though heatpipes 104/106/108 may essentially take on any suitable form, the arrangement shown has been found to be particularly advantageous. As shown, two flanking heatpipes 104/106 may be configured and disposed to as to collectively describe a large arc (e.g., a semicircle) about a circumference of fan 116. In this manner, they may essentially be disposed directly atop fansink fins 112, thus affording efficient heat transfer. At the same time, a central heatpipe 108, which essentially bisects the space defined by heatpipes 104 and 106, may extend through CPU plate 102 as shown to reach a portion of fansink enclosure 110 short of the opening where fan 116 is disposed. This central heatpipe 108 can further extend in a general direction away from CPU plate 102 and fansink enclosure 110 to be in thermal communication with one or more other heat-producing elements and/or one or more additional plates similar to CPU plate 102.

Figure 2:
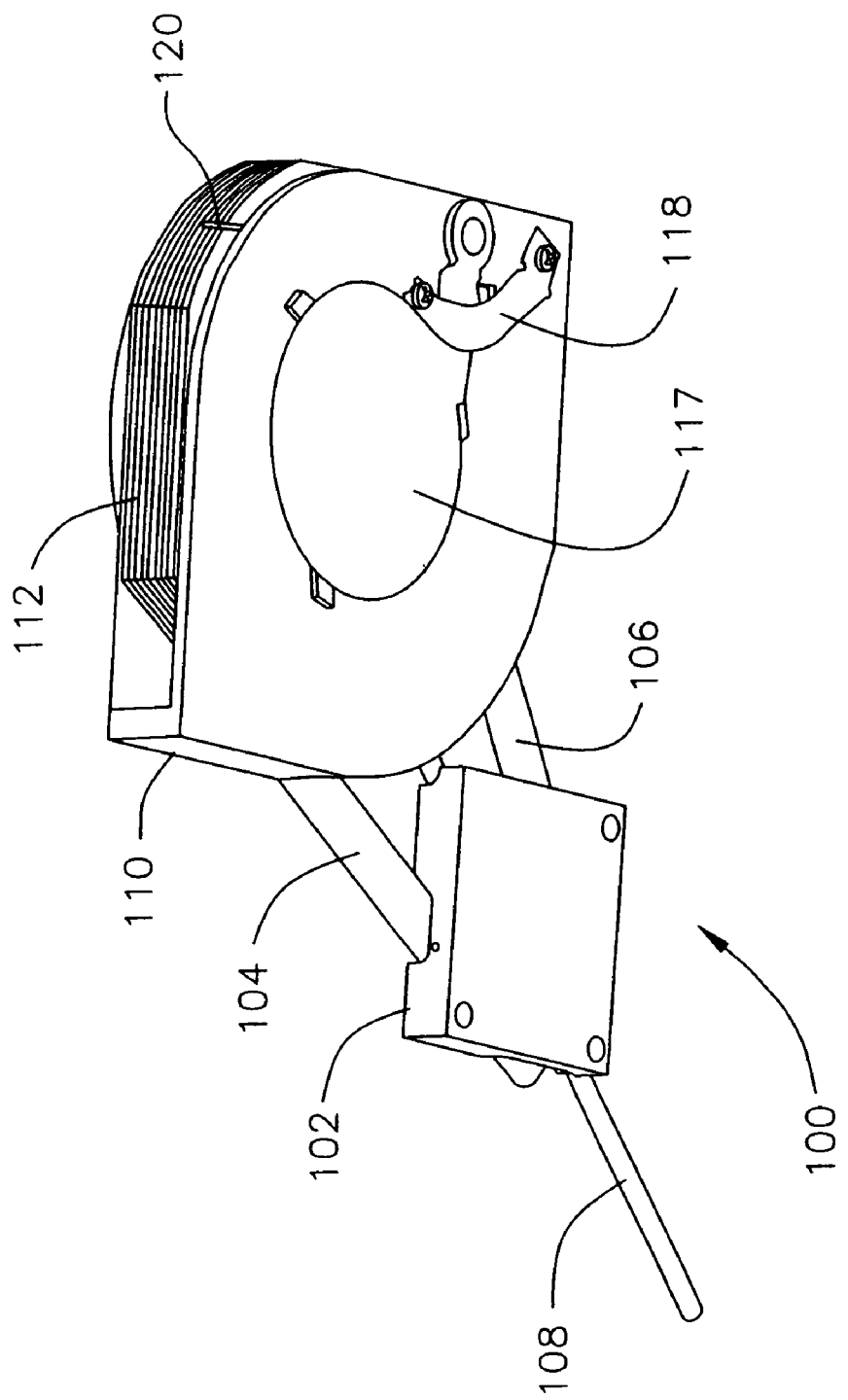
FIG. 2 provides a bottom perspective view of the fansink arrangement of FIG. 1

FIG. 2 provides a bottom perspective view of fansink arrangement 100. In accordance with a preferred embodiment of the present invention, there is preferably provided a reciprocable shutter door 117 configured for covering an opening below fan 116 (see FIG. 1). This opening would then cooperate with another opening in the outer structure of a laptop so as to be able to draw in air from the underside of the laptop.

The shutter door 117 is shown in FIG. 2 in a closed position. Preferably the door 117 is pivotable over an arc defined and constrained by a retainer arrangement 118. Though the retainer arrangement may take on a very wide variety of conceivable forms, here it is shown as a metal or plastic strip which is screwed into the underside of the fansink enclosure, whereby movement of an arm of door 117 is constrained by the screws. As such, when door 117 is closed as shown, the fan 116 (see FIG. 1) would be unable to draw air through this area. Preferably, the shutter door 117 is controlled via a shutter door spring pin arm 120.

The pin arm 120 may preferably be configured and disposed such that when the laptop is mated with a docking station, suitable structural features on the docking station will push the spring pin arm 120 in a manner to open the shutter door 117, to allow air to be drawn in through opening previously covered by the door 117. Preferably, for as long as the laptop stays in the docking station, the door 117 will remain away from the opening it covered. When the laptop is removed from the docking station, the spring pin arm 120 will then be relieved of this force and the shutter door 117 will close over that opening.

It should be understood that while a laptop docking station represents a viable application for the features described here, other contexts for "docking" a laptop, and which would be compatible with the features described, are of course conceivable, such as (for instance) a port replicator. It should further be appreciated that, in certain instances, it may be desirable to configure the fan 116 (see FIG. 1) not only to draw air inwardly but to optionally exhaust outwardly.

Figure 3:
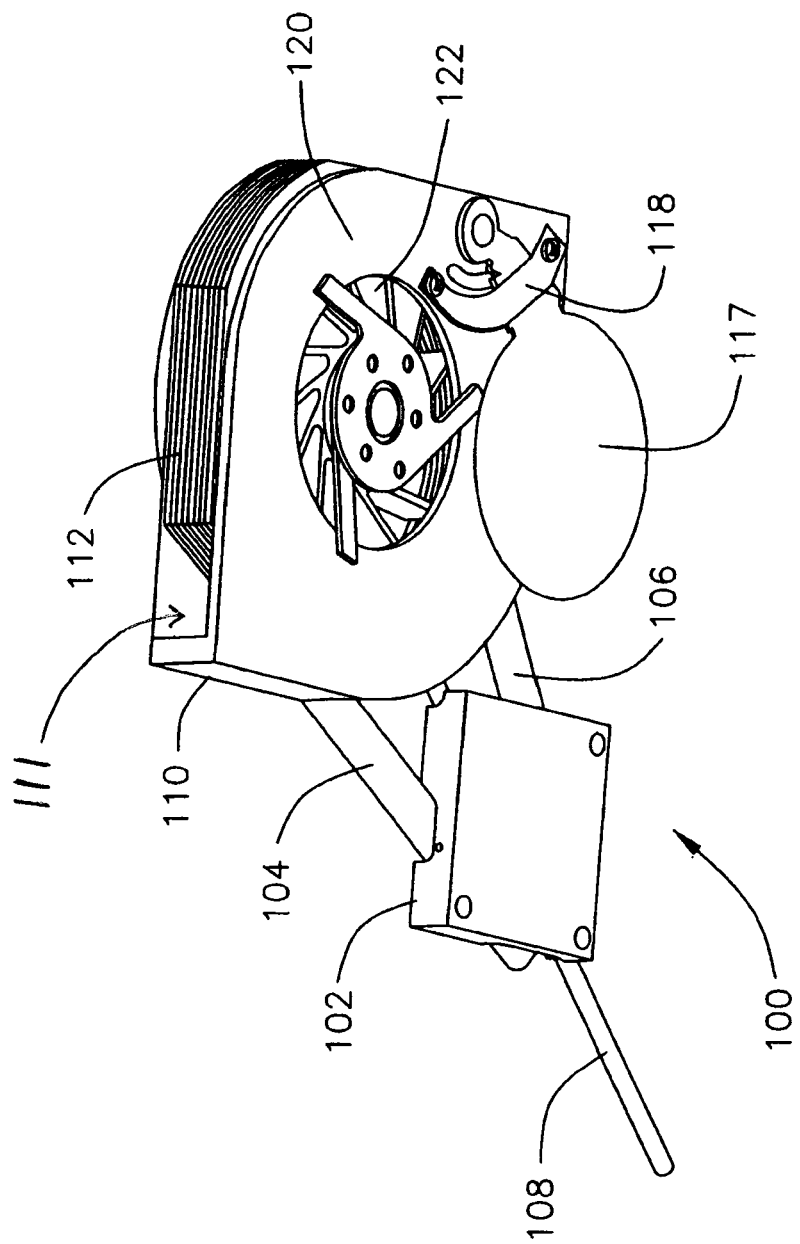
FIG. 3 provides essentially the same view as FIG. 2, but showing a shutter door in an open position.

FIG. 3 provides essentially the same view as FIG. 2, but showing the door 117 in an open position. The resulting "bottom" intake area at opening 122 is thus available to draw air inwardly in addition to the sides 111 of enclosure 110.

Figure 4:
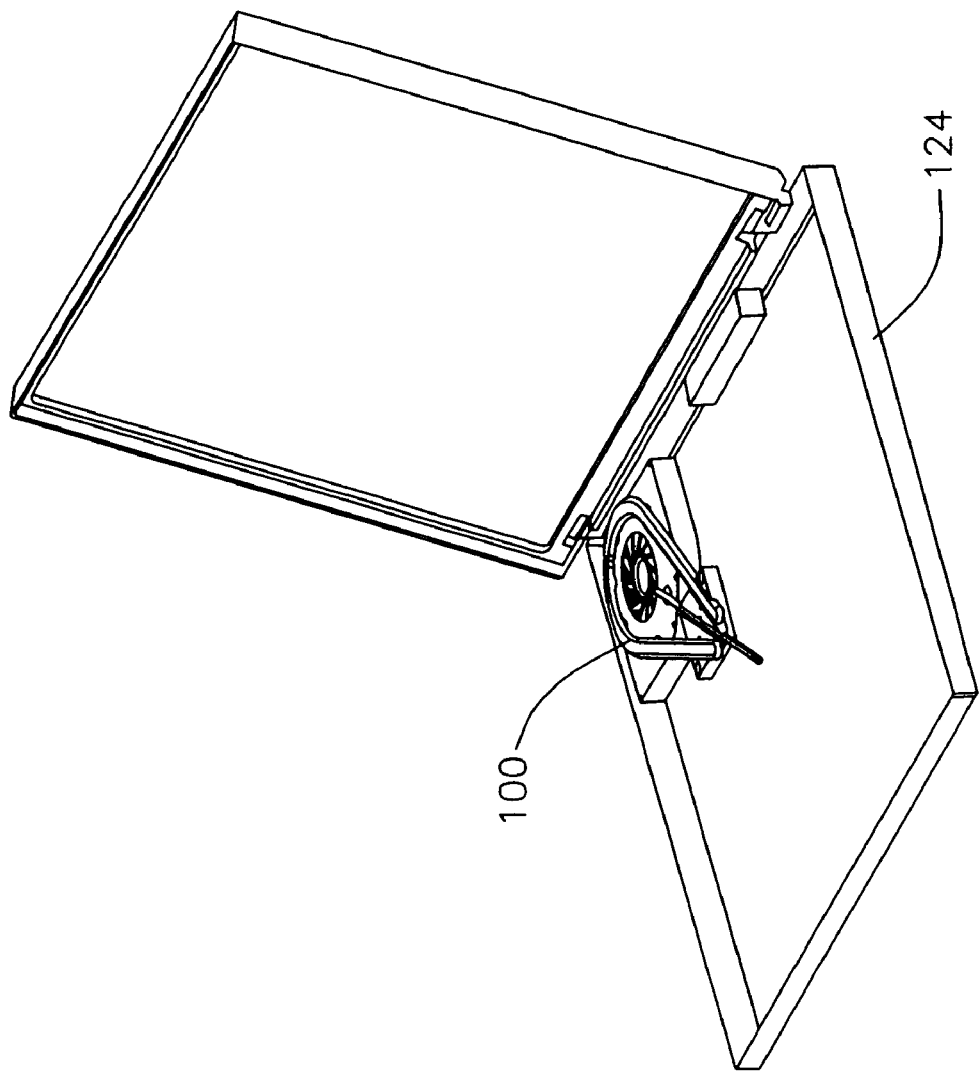
FIG. 4 shows, in perspective view, a fansink installed in a laptop.
Figure 5:
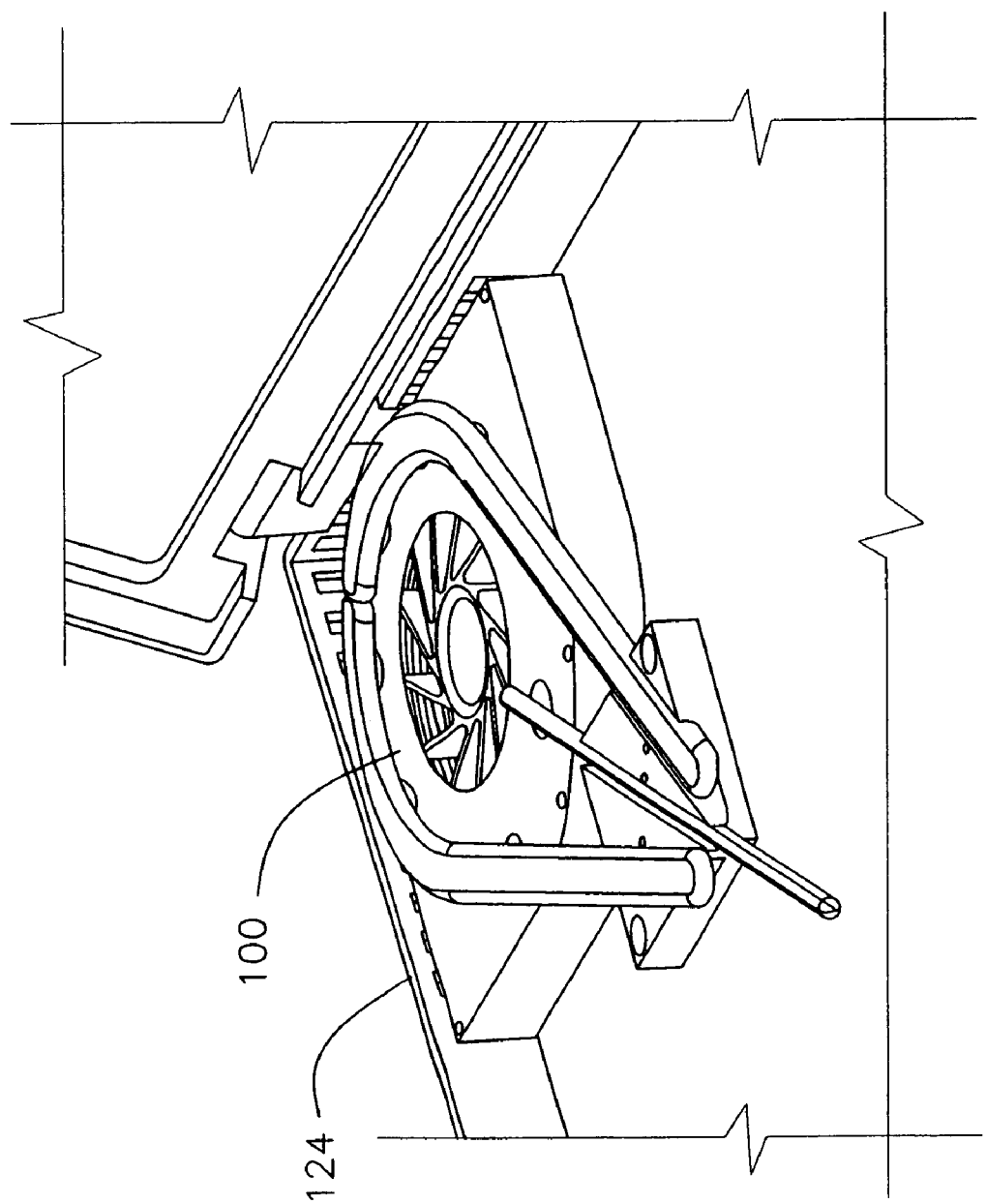
FIG. 5 is an enlarged view taken from Fig., showing a fansink.

FIG. 4 shows the fansink 100 as installed in a laptop 124 (where the system board is not illustrated to permit greater clarity). Here, fansink 100 is shown as being positioned in a rear left corner of laptop 124, to permit the eased evacuation or ingress of air along two-sides of the laptop 124. FIG. 5 is an enlarged view taken from FIG. 4, showing the fansink 100.

Figure 6:
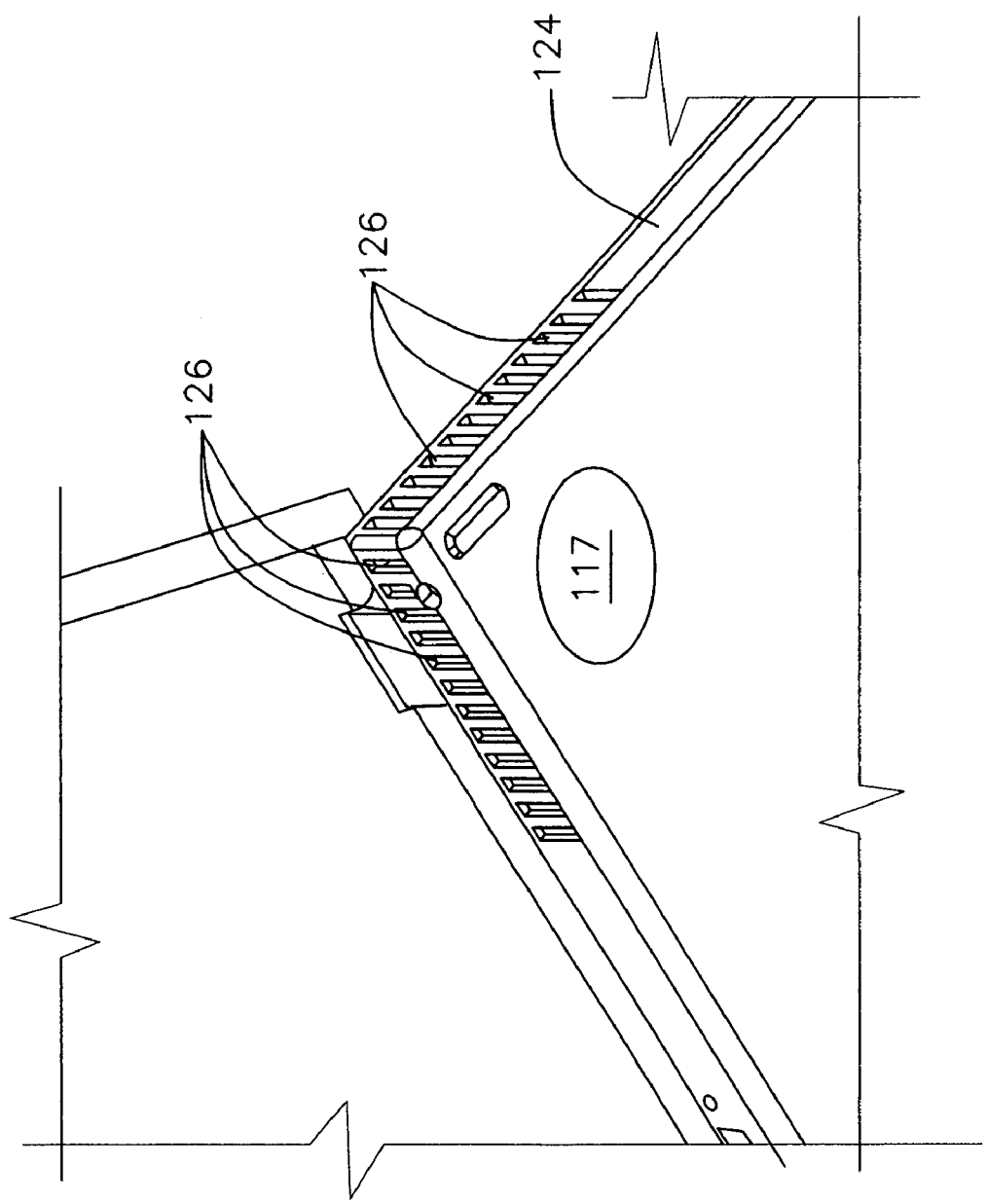
FIG. 6 shows the underside of the laptop of FIG. 4 in an "undocked" position.

FIG. 6 shows the underside of the laptop 124 as it would be in the "undocked" position. The spring pin arm would not be actuated in this mode and, therefore, the shutter door 117 would be closed, along with the air intake on the bottom side of the laptop 124. Also shown are vent holes 126 as may be disposed in the sides of laptop 124, which could be cooperable with the fansink fins 112 (see e.g. FIG. 1).

Figure 7:
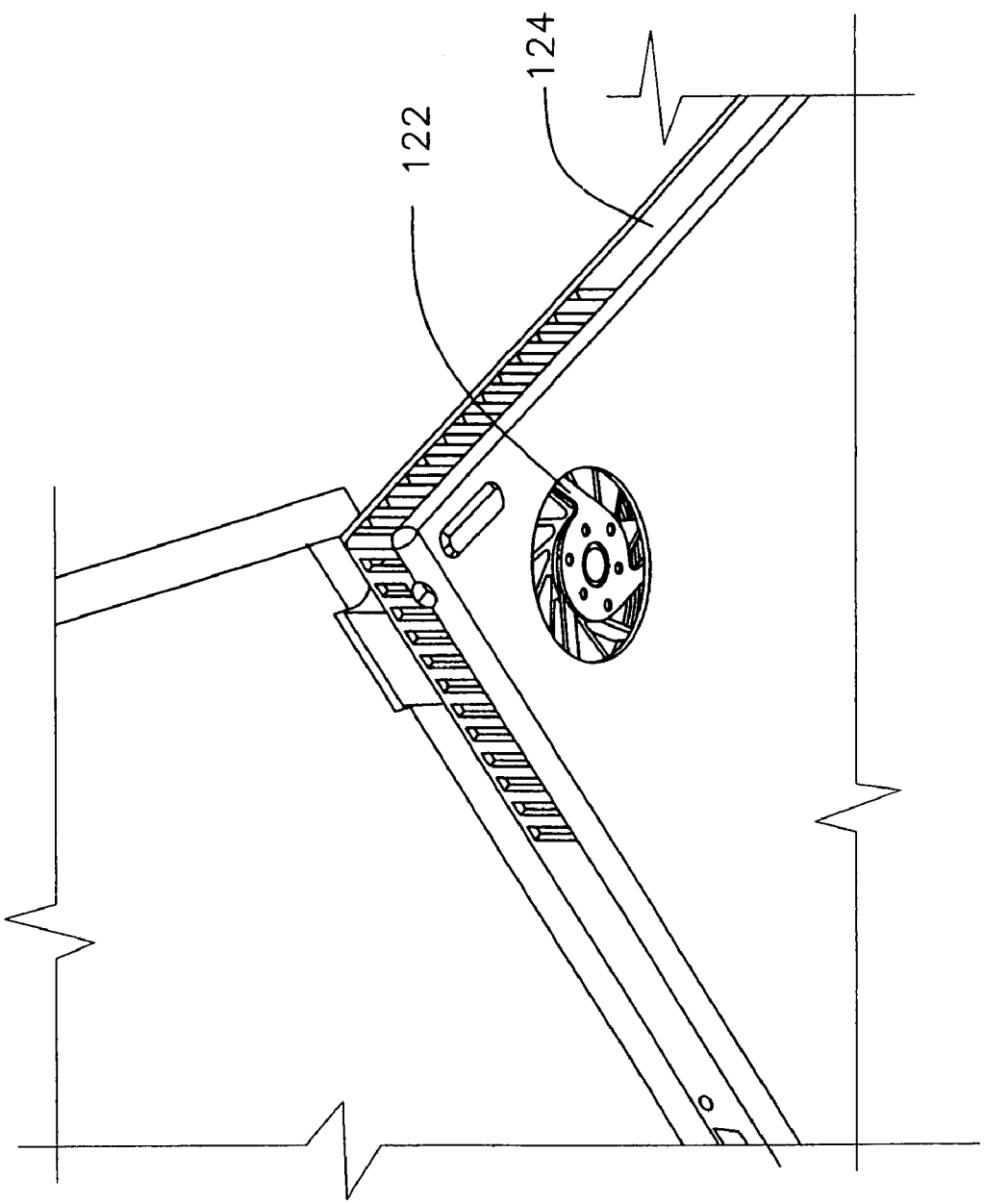
FIG. 7 shows the underside of the laptop of FIG. 4 in a "docked" position.

On the other hand, FIG. 7 shows the underside of the laptop 124 as it would appear in the "docked" position. As mentioned before, the spring pin arm would preferably be actuated in this mode by a feature in the docking arrangement and, therefore, the shutter door (hidden here) would be opened. The air intake on the bottom side of the laptop is now opened and the fan can draw air into or out of the laptop 124 through opening 122.

Figure 8:
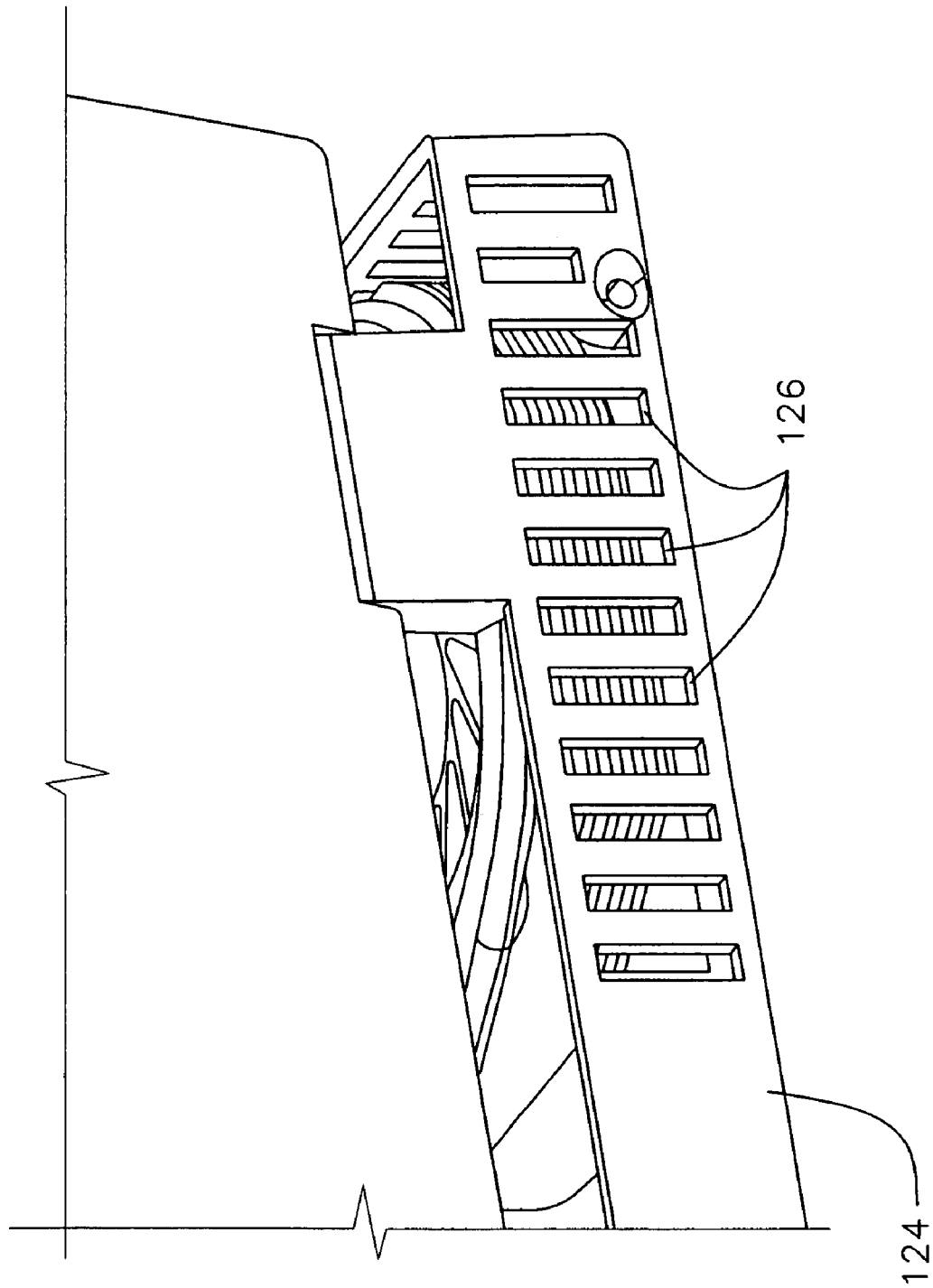
FIG. 8 shows a close-up view of the laptop of FIG. 4 at the rear of a left rear corner thereof.

FIG. 8 shows a view of the laptop 124 from the rear of the left rear corner, showing the side vent holes 126 just mentioned.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:

a fan; and a fansink enclosure disposed within a laptop;

wherein said fan is mounted within said fansink enclosure;

wherein said fansink enclosure comprises:

a first air intake arrangement being adapted to admit air towards or away from said fan, wherein said first air intake arrangement comprises a bottom of said fan sink enclosure having an opening disposed therein;

a second air intake arrangement being adapted to admit air towards or away from said fan; and a shutter arrangement which selectively impedes the admission of air towards or away from said fan by selectively covering said first air intake arrangement, said shutter arrangement being actuable in response to at least one operating or positional condition of the laptop, wherein said shutter arrangement covers the opening contingent upon a first operating or positional condition of the laptop and at least partially uncovers said opening contingent upon a second operational or positional condition of the laptop; wherein the first operating or positional condition of the laptop; wherein the first operating or positional condition of the laptop is a mode wherein the laptop is not docked; and wherein the second operating or positional condition of the laptop is a mode wherein the laptop is docked.

2. The apparatus according to claim 1, wherein said shutter arrangement fully uncovers said first air intake arrangement contingent upon the second operating or positional condition of the laptop.

3. The apparatus according to claim 1, wherein said first air intake arrangement aligns with an underside of the laptop having an opening disposed therein.

4. The apparatus according to claim 3, wherein said second air intake arrangement aligns with at least one side of the laptop having an opening therein.

5. The apparatus according to claim 1, further comprising a heatsink arrangement disposed within said fansink enclosure and adjacent at least one of said first and second air intake arrangements.

6. The apparatus according to claim 5, further comprising:
a CPU plate; and
at least one heatpipe interconnecting said CPU plate with said fansink enclosure.

7. The apparatus according to claim 1 wherein said shutter arrangement is actuated mechanically.

8. The apparatus according to claim 1 wherein said second operating or conditional position of the laptop places a greater thermal demand on the laptop.

* * * * *